US 6,610,187 B2

(12) United States Patent
Nonomura et al.

(10) Patent No.: US 6,610,187 B2
(45) Date of Patent: Aug. 26, 2003

(54) DIP TYPE SURFACE TREATMENT APPARATUS AND DIP TYPE SURFACE TREATMENT METHOD

(75) Inventors: Hiromi Nonomura, Saitama-ken (JP); Youji Honda, Tokyo (JP); Genji Nakayama, Fukuoka-ken (JP); Yasuo Takamizu, Tokyo (JP); Hirokazu Sugiyama, Kanagawa-ken (JP)

(73) Assignees: Nissan Motor Co., Ltd., Kanagawa-ken (JP); Taikisha Ltd., Tokyo (JP)

( * ) Notice: Subject to any disclaimer, the term of this patent is extended or adjusted under 35 U.S.C. 154(b) by 58 days.

(21) Appl. No.: 09/804,059

(22) Filed: Mar. 13, 2001

(65) Prior Publication Data

US 2001/0035126 A1 Nov. 1, 2001

(30) Foreign Application Priority Data

Mar. 15, 2000 (JP) .................... P2000-71609
Nov. 9, 2000 (JP) .................... P2000-342321
Feb. 14, 2001 (JP) .................... P2001-36692

(51) Int. Cl.[7] .............................................. C25D 13/00
(52) U.S. Cl. .................. 204/512; 204/482; 204/623; 210/805; 118/602
(58) Field of Search ................... 204/512, 623, 204/482; 210/805; 118/602

(56) References Cited

U.S. PATENT DOCUMENTS 3,496,082 A * 2/1970 Orem et al. ................ 204/512
4,568,438 A * 2/1986 Lauke ........................ 204/512

FOREIGN PATENT DOCUMENTS

| JP | 6-272091 | | 9/1994 |
| JP | 6-272092 | | 9/1994 |
| JP | 07-018494 A | * | 1/1995 |
| JP | 8-41687 | | 2/1996 |
| JP | 11-200092 | | 7/1999 |
| JP | 11-200092 A | * | 7/1999 |

* cited by examiner

Primary Examiner—Kishor Mayekar
(74) Attorney, Agent, or Firm—McDermott, Will & Emery

(57) ABSTRACT

There is provided an electrodeposition coating apparatus for dipping a body into an electrodeposition coating liquid filled in an electrodeposition tank, which includes a first circulation system for causing a flow direction of the coating liquid in a surface area and an intermediate area through which the body passes in the electrodeposition tank to be opposite to a moving direction of the body, and a second circulation system for causing a flow direction of the coating liquid in a bottom area in the electrodeposition tank to be equal to the moving direction of the body.

17 Claims, 10 Drawing Sheets

FIG. 6

| CIRCULATION SYSTEM | CONVENTIONAL METHOD | FIRST EMBODIMENT |
|---|---|---|
| PUMP TYPE | VERTICAL/HORIZONTAL PUMP | HORIZONTAL PUMP |
| FOREIGN PARTICLE VANISHING TIME (s) | ∞ (MORE THAN 10MIN) | 140 |
| FOREIGN PARTICLE DISCHARGE RATIO (3MIN) | 57.1% | 97.2% |
| BODY RELATIVE FLOW VELOCITY (m/s) | 0.10 | 0.24 |
| OVERALL JUDGMENT | × | ○ |

FIG. 8

| | CONVENTIONAL METHOD | SECOND EMBODIMENT |
|---|---|---|
| CIRCULATION SYSTEM | | |
| PUMP TYPE | VERTICAL/HORIZONTAL PUMP | HORIZONTAL PUMP |
| FOREIGN PARTICLE VANISHING TIME (s) | ∞ (MORE THAN 10MIN) | 140 |
| FOREIGN PARTICLE DISCHARGE RATIO (3MIN) | 57.1% | 97.2% |
| BODY RELATIVE FLOW VELOCITY (m/s) | 0.10 | 0.24 |
| OVERALL JUDGMENT | × | ○ |

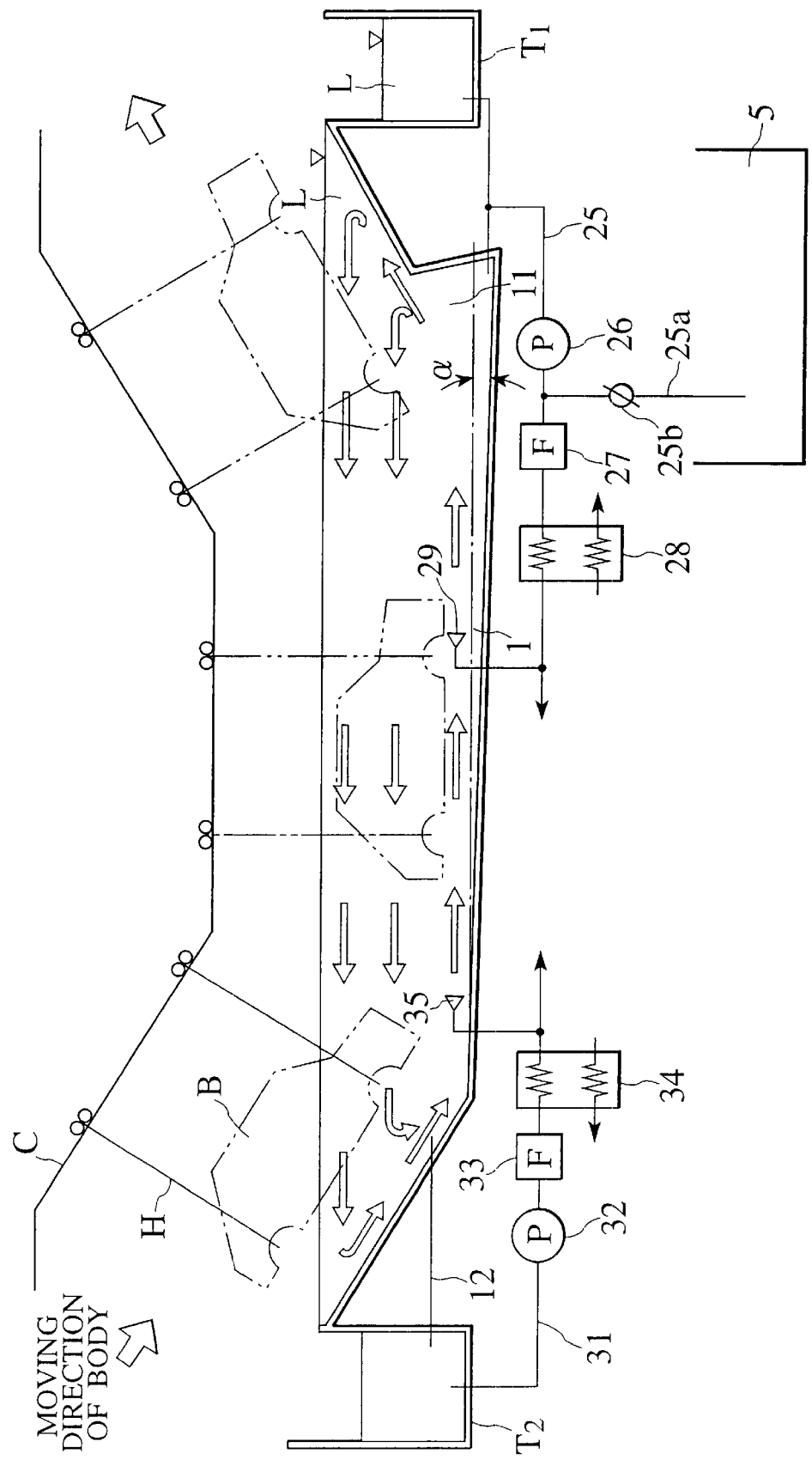

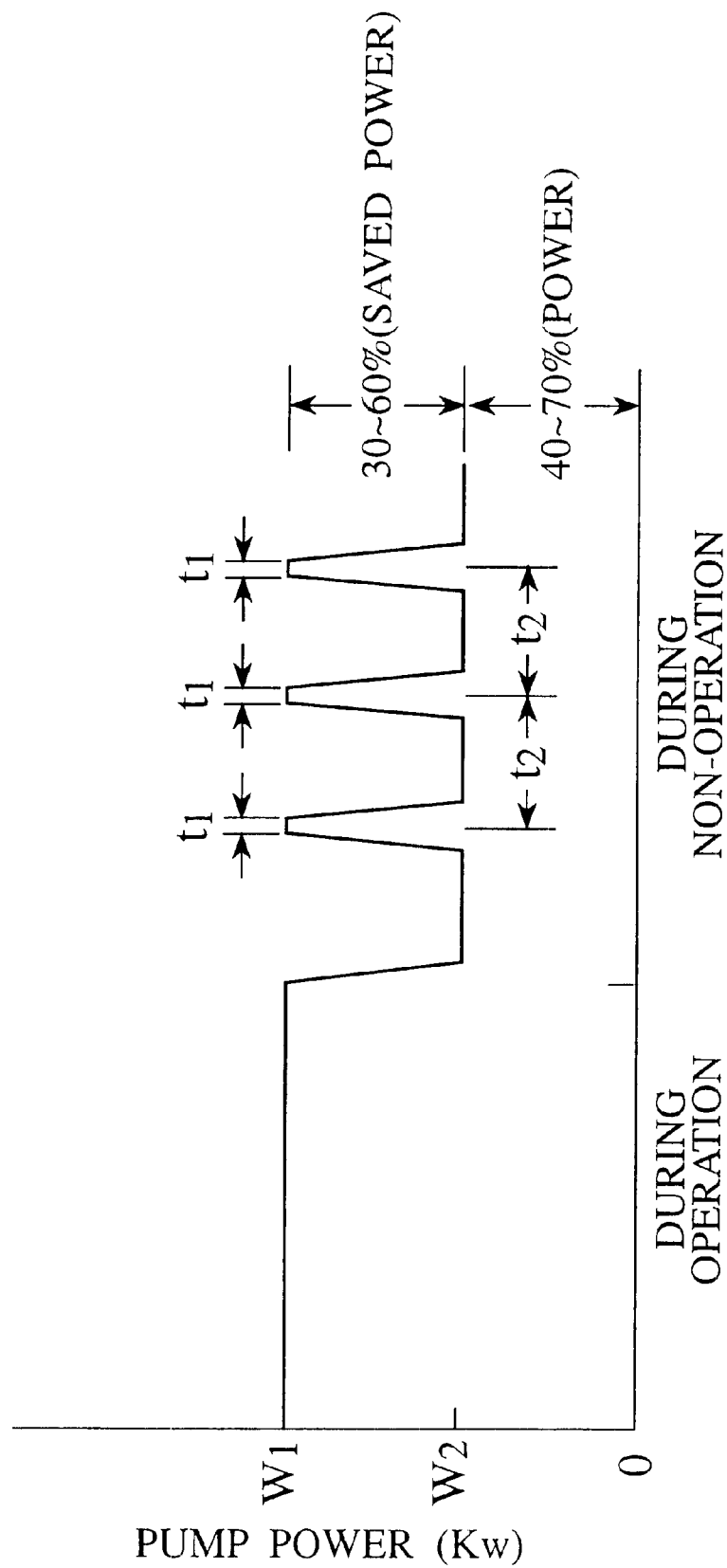

DIP TYPE SURFACE TREATMENT APPARATUS AND DIP TYPE SURFACE TREATMENT METHOD

BACKGROUND OF THE INVENTION

1. Field of the Invention

The present invention relates to a dip type surface treatment apparatus of full dip or half dip, which is provided in a coating line for vehicle bodies or vehicle parts and a dip type surface treatment method, especially an electrodeposition coating apparatus and an electrodeposition coating method, and more particularly, it relates to a dip type surface treatment apparatus and a dip type surface treatment method of a countercurrent type obtained by slightly altering existing facilities.

2. Description of the Related Art

A three-coating system comprising base coating, intermediate coating and finish coating is employed for the coating of a vehicle body, but among them, for the base coating process, there is widely used, for example, a dipping coating method by which a vehicle body is fully dipped into a treatment liquid or a coating liquid in a process such as a degreasing treatment, a chemical treatment or electrodeposition coating.

In this kind of dipping coating method, since the vehicle body which is continuously carried must be fully dipped for a predetermined period of time, a large amount of the treatment liquid or the coating liquid is accommodated in a treatment tank or a coating tank.

Among others, since the electrodeposition coating liquid is diluted to a low solid content, pigment sedimentation occurs if constant or intermittent stirring is not performed. Further, a large amount of the liquid is accommodated in a tank, and hence, if the pigment once settles down, the re-dispersion of the pigment is very difficult. If the dispersion of the pigment is uneven in the electrodeposition coating liquid, a coating film becomes scabrous, which influences a finish coating film.

Furthermore, in the electrodeposition coating for forming a coating film by a cataphoresis behavior, a reaction gas may be generated on a coating surface at the time of forming the coating film, i.e., dipping. If the air bubbles are left as they stand, they remain in the coating film which is being deposited, thereby leading to a defect in the coating film. In this regard, an appropriate flow velocity must be given to the electrodeposition coating liquid in the tank to thereby remove the reaction gas from the coating surface.

Moreover, in the electrodeposition coating, since heat of reaction is produced in formation of a coating film, a coating temperature is increased in the vicinity of the coating surface and the coating resistance is lowered. When these changes are left as they are, a locally thick film may be generated. If the electrodeposition film thickness is uneven, the coating film surface quality such as visual effects or a paintwork becomes also uneven. When the film is too thick, a cost problem can also occur. Therefore, the stirring in a tank is required in order to supply the coating liquid having an appropriate temperature to the coating surface to be cooled down.

On the other hand, in a welding process which is a pre-process of the coating process, since vehicle body panels are joined to be assembled by, e.g., spot welding or arc welding, the vehicle body on which metal powder such as spatters generated at spot welding remains is carried into a coating process. In the pre-treatment process of the electrodeposition coating process, a multi-stage cleaning process is provided in order to flush away these extraneous substances, but fine metal powder or extraneous substances which have adhered in a car interior can not be completely washed away.

When such metal powder is brought into the electrodeposition tank, it again adheres to a horizontal part of the vehicle body in particular and it enters the electrodeposition coating film to provoke a defect of the coating film. Therefore, the stirring in a tank is used in order to remove extraneous substances such as metal powder which may adhere to the coating surface and discharge them to outside of a tank by a filter.

As described above, in the light of prevention of the pigment sedimentation or uniformization of the pigment dispersion, removal of air bubbles or heat, and prevention of adhesion of extraneous substances, the stirring in the electrodeposition tank is carried out.

As this type of stirring in a tank, there is known a coating circulation system disclosed in Japanese patent applications laid-open Nos. 272091-1994, 272092-1994, and 41687-1996.

The stirring in a tank according to the conventional coating circulation system is generally as follows.

That is, a vehicle body as a coating target is hanged by a hanger and brought into an electrodeposition tank, in which a electrodeposition coating liquid is filled, by an overhead conveyer at a constant speed.

The vehicle body is put into the electrodeposition tank at an angle of approximately 30° and passes through inside the tank while assuring a full-dip time not less than three minutes. The vehicle body is then raised at angle of approximately 30°. During this process, a direct-current voltage of approximately 300 V is applied to the cationic electrodeposition coating in the electrodeposition tank through electrode plates arranged on a side wall and a bottom wall of the electrodeposition tank. As a result, cataphoresis of coating particles is generated between the electrode plates and the body as a ground side, thereby forming an electrodeposition coating film on inside and outside plates or an inner surface of a bag-like structure of the body B.

In the conventional stirring in the tank, the coating liquid is sucked from the overflow tank and then discharged into the tank, or the coating liquid is sucked from the electrodeposition tank itself and then discharged into the tank again to form a flow whose direction is equal to a moving direction of the body in a surface layer portion of the coating liquid in the tank. On the other hand, in a low layer portion of the coating liquid, a flow in an opposite direction is formed, thereby generating the large circulation of the coating liquid in the tank as a whole.

SUMMARY OF THE INVENTION

However, when a direction of the surface flow is equal to a moving direction of the body as in the conventional electrodeposition coating apparatus, there extremely increases such a tendency as that foreign particles brought by the body spread in the entire electrodeposition tank at an inlet portion of the tank. Further, since foreign particles float with movement of the body before reaching the overflow tank, such foreign particles are disadvantageously embedded in the coating film during the formation of the electrodeposition film.

When a direction of the surface flow is equal to a moving direction of the body, the relative velocity of the liquid flow and the body must be set equal to or above a predetermined value in order to maintain the effect for removing the above-described air bubbles or heat of reaction, which may increase the energy required for the stirring. In addition, there is also a problem that the extremely high liquid flow in the electrodeposition tank easily causes bubbles to be sucked and the bubbles adhere to the body. Thus, there is an upper limit for increase in the liquid flow. In the usual coating line of the vehicle body, a conveyer speed is 0.1 m/s and a liquid flow speed is 0.2 m/s, which results in the relative velocity of 0.1 m/s.

Accordingly, one of the present applicants has precedently proposed that a direction of the liquid flow in the electrodeposition tank is opposite to a moving direction of the body and the overflow tank is arranged on the inlet side of the electrodeposition tank (see Japanese patent application laid-open No. 200092-1999). With this arrangement, the relative velocity of the liquid flow and the body is increased and the effect for removing air bubbles or heat of reaction is enhanced. Further, foreign particles brought by the body can be discharged from the inlet portion directly to the overflow tank.

However, in the case that this electrodeposition coating apparatus is used, there is no problem in the installation of a new facility, but a large amount of facility cost is required when the conventional following current type electrodeposition coating apparatus is changed to the counter current type apparatus, which is not practical.

In view of the above-described problems in the prior art, an object of the present invention is to provide a dip type surface treatment apparatus and a dip type surface treatment method of the countercurrent type obtained only by slightly altering an existing facility.

To achieve this aim, there is provided a dip type surface treatment apparatus for dipping a treatment object into a treatment liquid filled in a treatment tank, the apparatus comprising: a first circulation system for causing a flow direction of the treatment liquid in a surface area and an intermediate area through which the treatment object passes in the treatment tank to be opposite to a moving direction of the treatment object; and a second circulation system for causing a flow direction of the treatment liquid in a bottom area in the treatment tank to be equal to the moving direction of the treatment object.

Further, to achieve the above aim, there is provided a dip type surface treatment method for dipping an object to be treated into a treatment liquid filled in a treatment tank, the method comprising: causing a flow direction of the treatment liquid in a surface area and an intermediate area through which the treatment object passes in the treatment tank to be opposite to a moving direction of the treatment object; and causing a flow direction of the treatment liquid in a bottom area in the treatment tank to be equal to the moving direction of the treatment object, thereby treating the treatment object.

Moreover, to achieve the above aim, there is provided an electrodeposition coating apparatus for applying a voltage between a coating object dipped in a coating liquid in an electrodeposition tank and an electrode to form a coating film, the apparatus comprising: a first circulation system for causing a flow direction of the coating liquid in a surface area and an intermediate area through which the coating object passes in the electrodeposition tank is opposite to a moving direction of the coating object; and a second circulation system for causing a flow direction of the coating liquid in a bottom area in the electrodeposition tank is equal to the moving direction of the coating object.

The nature, principle and utility of the invention will become more apparent from the following detailed description when read in conjunction with the accompanying drawings.

BRIEF DESCRIPTION OF THE DRAWINGS

In the accompanying drawings:

FIG. 6 is a chart showing an experimental result concerning a foreign particle vanishing time, a foreign particle discharge ratio and a body relative velocity in the first embodiment according to the present invention;

FIG. 8 is a chart showing an experimental result concerning a foreign particle vanishing time, a foreign particle discharge ratio and a body relative velocity in the second embodiment according to the present invention;

FIG. 9 is a cross-sectional view showing an electrodeposition coating apparatus as a third embodiment of a dip type surface treatment apparatus according to the present invention; and FIG. 10 is a graph showing an example of driving a pump used in the dip type surface treatment apparatus according to the present invention.

DESCRIPTION OF THE PREFERRED EMBODIMENTS

First Embodiment

A first embodiment according to the present invention will now be described with reference to accompanying drawings.

Figure 1:
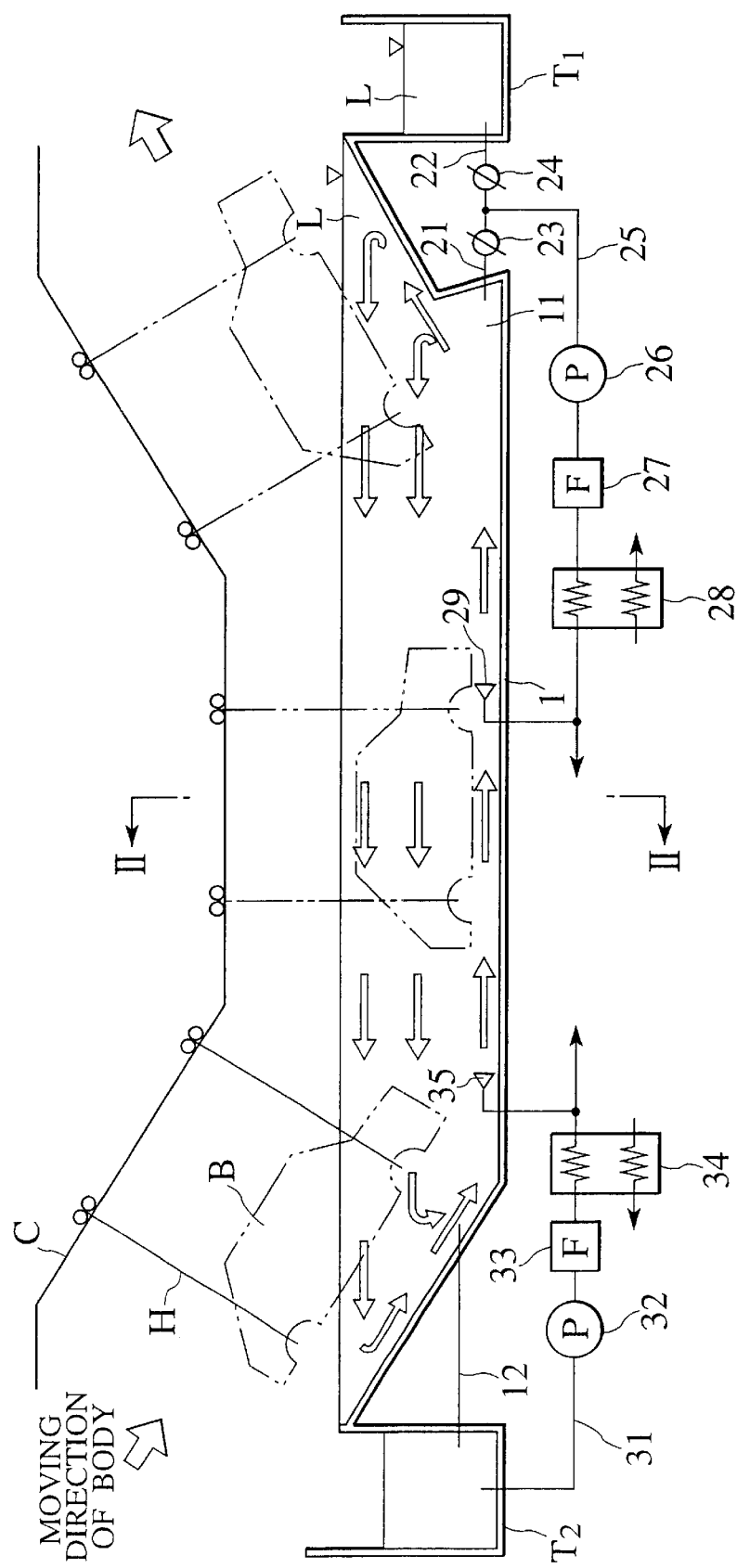
FIG. 1 is a cross-sectional view showing an electrodeposition coating apparatus as a first embodiment of a dip type surface treatment apparatus according to the present invention.

An electrodeposition coating apparatus according to the first embodiment has an elongated ship-like electrodeposition tank (treatment tank) 1, and an electrodeposition coating liquid L is filled in the electrodeposition tank 1. An vehicle body B as a coating object (treatment object) is suspended by a hanger H and carried by an overhead conveyer C at a constant speed. In order to completely dip the body B into the electrodeposition tank 1, the overhead conveyer C is downwardly inclined at an angle of approximately 20° to 40° on the inlet side of the electrodeposition tank 1, maintains in an effective area in the electrodeposition tank a height at which the body B is completely dipped, and is upwardly inclined at an angle of approximately 20° to 40° on the outlet side. In FIG. 1, the left-hand side in the drawing corresponds to the inlet side and the right-hand side in the same corresponds to the outlet side.

The effective area in the electrodeposition tank, i.e., a length of the electrodeposition tank 1 along which the body B is completely dipped is set so that the full dipping time not less than three minutes can be assured. In case of a cationic electrodeposition coating material, when the body B is dipped, a direct-current voltage of approximately 300 V is applied to the electrodeposition coating L through electrode plates (not shown) arranged on a side wall and a bottom wall of the electrodeposition tank 1, and cataphoresis of coating particles is thereby caused between the coating material and the grounded body B, thus forming an electrodeposition coating film on the inside and outside plates or the inner surface of a bag-like structure.

An overflow tank T1 is provided outside the electrodeposition tank 1 on the outlet side, and the electrodeposition coating liquid L which has come out of a lasher between the electrodeposition tank 1 and the overflow tank T1 flows into the overflow tank T1.

Another overflow tank T2 is also provided outside the electrodeposition tank 1 on the inlet side, and the electrodeposition coating liquid L which has come out of a lasher between the electrodeposition tank 1 and the overflow tank T2 flows into the overflow tank T2. Providing the overflow tank T2 can lead foreign particles and the like contained in a liquid flow in the surface area which flow in opposition to the body B directly to the overflow tank T2.

It is to be noted that the overflow tank is provided on the outlet side in the conventional following current type electrodeposition tank, and the overflow tank T1 on the outlet side can be hence used without making any change in case of altering the following current type electrodeposition tank to the counter current type electrodeposition tank. Thus, only installation of the new overflow tank T2 on the inlet side can suffice.

Figure 3:
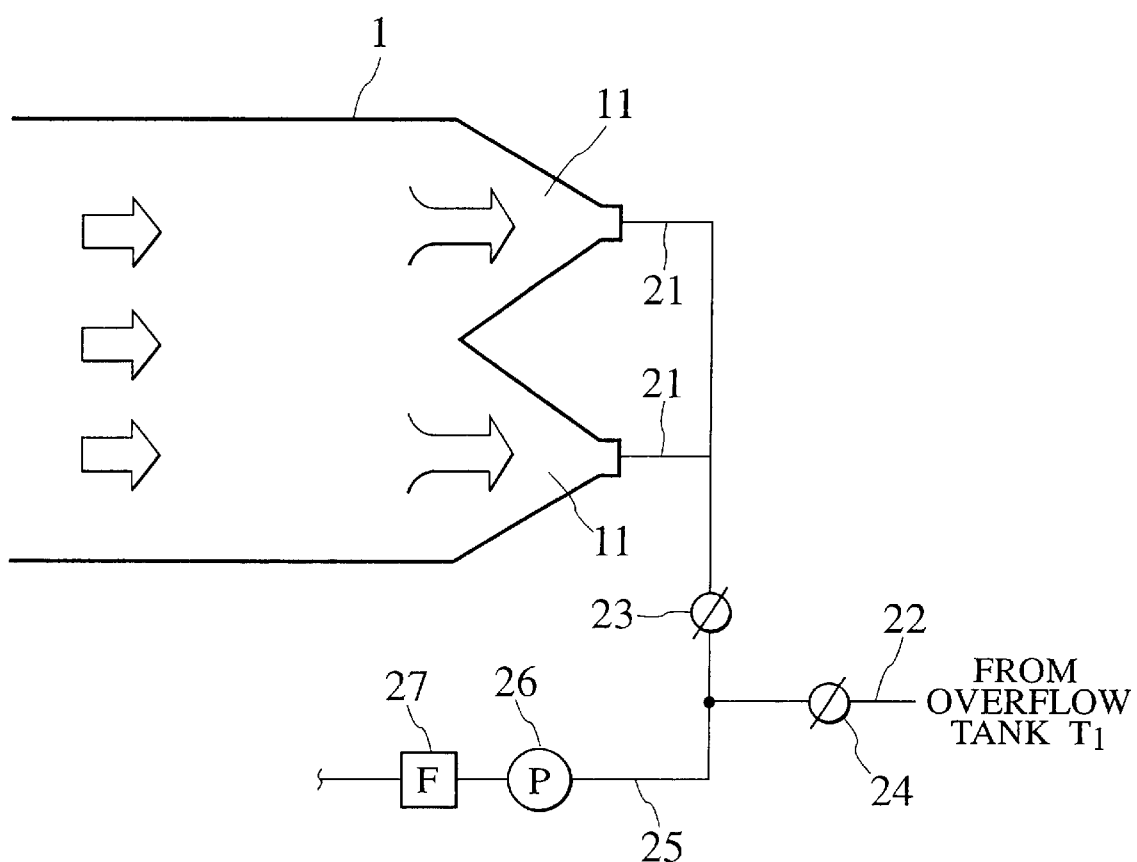
FIG. 3 is a plane view showing a primary part of the electrodeposition coating apparatus depicted in FIG. 1.

A hopper 11 is formed at the bottom of the inclined surface of the electrodeposition tank 1 on the outlet side, and the two hoppers 11 are formed in the widthwise direction of the electrodeposition tank 1 as shown in plane view of FIG. 3. The hopper 11 collects a part of the electrodeposition coating liquid L which has flowed down in the later-described bottom area, and a coating pipe 21 is provided at the end of the hopper 11. Since most of extraneous substances contained in the electrodeposition coating liquid L which have flowed down in the bottom area are led to the hopper 11 side by its own weight and the inertia of the liquid flow from the bottom area, the filtering effect obtained by a filter 27 can be greatly expected by providing the hopper 11, and the electrodeposition coating liquid L to be returned to the electrodeposition tank 1 has a small amount of extraneous substances mixed therein.

A coating pipe 22 is also provided to the overflow tank T1 on the outlet side and connected to the coating pipe 21 provided to the hopper 11 to constitute a coating pipe 25. Here, in order to adjust an amount of electrodeposition coating liquid sucked from the electrodeposition tank 1 through the hopper 11 and an amount of the electrodeposition coating liquid sucked from the overflow tank Ti, flow regulating valves 23 and 24 are provided to the respective coating pipes 21 and 22. For example, 60% of the electrodeposition coating liquid is sucked from the electrodeposition tank 1 and 20% of the same is sucked from the overflow tank T1, and the remaining electrodeposition coating liquid is sucked from the later-described overflow tank T2 on the inlet side and then discharged into the electrodeposition tank 1, which is not restrictive.

A suction pump 26, the filter 27, a heat exchanger 28 and a plurality of nozzles 29 (only one nozzle is shown in FIG. 1 for convenience' sake) are provided to the coating pipe 25, and the electrodeposition coating liquid L from the overflow tank T1 and the electrodeposition tank 1 through the hopper 11 is sucked by the pump 26 and then filtered by the filter 27. Afterward, the electrodeposition coating liquid L is adjusted to an appropriate temperature by the heat exchanger 28 and partially discharged from the nozzles 29 toward the outlet side in the vicinity of the bottom of the electrodeposition tank 1 on the outlet side. Further, another part of the electrodeposition coating liquid L is, as shown in FIG. 2, led to a plurality of nozzles 36 and 37 provided on the side wall on the outlet side and then discharged from these nozzles toward the inlet side of the electrodeposition tank 1.

Similarly, a coating pipe 31 is also provided to the overflow tank T2 on the inlet side, and a suction pump 32, a filter 33, a heat exchanger 34 and a plurality of nozzles 35 (only one nozzle is shown in FIG. 1 for the convenience' sake) are provided to the coating pipe 31. The electrodeposition coating liquid L in the overflow tank T2 is sucked by the pump 32, filtered by the filter 33, and then adjusted to an appropriate temperature by the heat exchanger 34. The electrodeposition coating liquid L is then partially discharged from the nozzles 35 toward the outlet side in the vicinity of the bottom of the electrodeposition tank 1 on the inlet side. Another part of the electrodeposition coating liquid L is, as shown in FIG. 2, led to a plurality of nozzles 36 and 37 provided on the side wall on the inlet side and discharged from these nozzles toward the inlet side of the electrodeposition tank 1.

Figure 2:
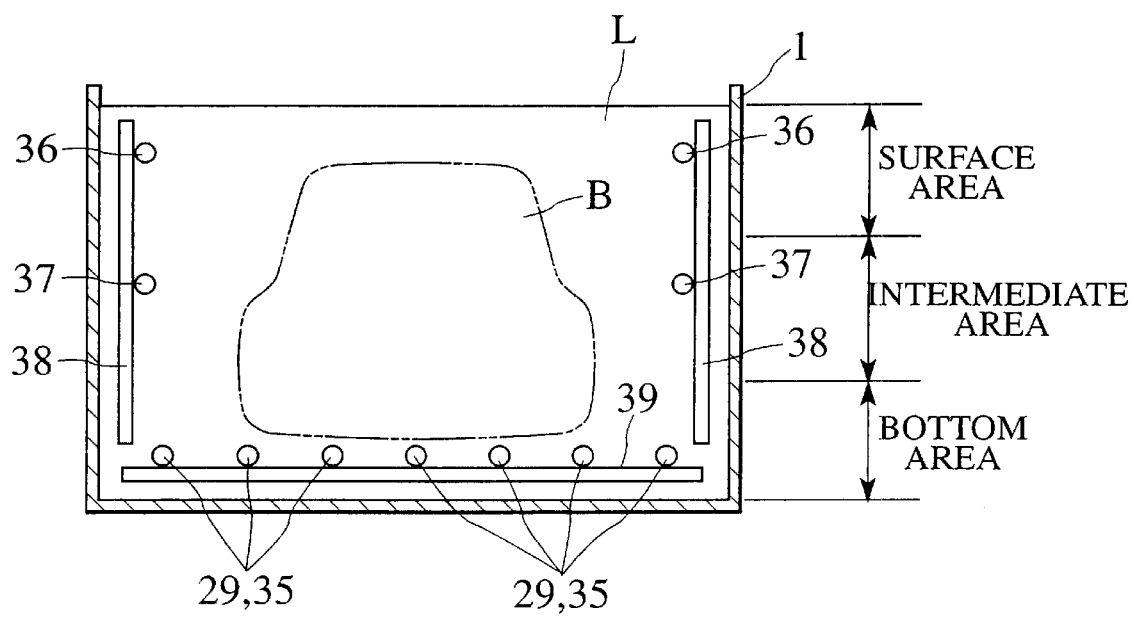
FIG. 2 is a cross-sectional view taken along the II—II line in FIG. 1.

As shown in FIG. 2, a plurality of holding pipes 38 are fixed to the both side walls of the electrodeposition tank 1 along its longitudinal direction, and the above-described nozzles 36 and 37 are attached to the holding pipes 38. Also, as depicted in FIG. 2, a plurality of holding pipes 39 are fixed to the bottom wall of the electrodeposition tank 1 along its longitudinal direction, and the above-mentioned nozzles 29 and 35 are attached to the holding pipes 39. It is to be noted that the holding pipes 38 and 39 and the nozzles 36 and 37 are omitted in FIG. 1.

The nozzles 36 arranged on the both side walls of the electrodeposition tank 1 are provided so that the electrodeposition coating liquid L is discharged toward the inlet side, and the liquid flow which flows in the surface area toward the inlet side in the entire liquid flow in the electrodeposition tank 1 is mainly generated by the discharge force of these nozzles 36.

Additionally, the nozzles 37 arranged on the both side walls of the electrodeposition tank 1 are provided so that the electrodeposition coating liquid L is discharged toward the inlet side, and the liquid flow which flows in the intermediate area toward the inlet side in the entire liquid flow in the electrodeposition tank 1 is mainly generated by the discharge force of these nozzles 37.

On the contrary, the nozzles 29 and 35 arranged on the bottom wall of the electrodeposition tank 1 are provided so that the electrodeposition coating liquid L is discharged toward with the outlet side, and the liquid flow which flows in the bottom area toward the outlet side in the entire liquid flow in the electrodeposition tank 1 is mainly generated by the discharge force from these nozzles 29 and 35.

Incidentally, although the surface area, the intermediate area and the bottom area according to this embodiment are illustrated, these areas do not have accurate boundaries. The surface area means the vicinity of a roof of the body; the intermediate area, a side surface of the body; and the bottom area, an area from the bottom wall to the vicinity of a floor of the body.

The operation will now be described.

The pump is driven, and the electrodeposition coating liquid L which has flowed down in the bottom area from the hopper 11 and the electrodeposition coating liquid L in the overflow tank T1 are sucked by adjusting the flow regulating valves 23 and 24 to a predetermined level of opening. The electrodeposition coating liquid L is filtered by the filter 27 and adjusted to an appropriate temperature by the heat exchanger 28. Thereafter, it is discharged from a plurality of the nozzles 29, 36 and 37 into the electrodeposition tank 1.

Similarly, the pump 32 is driven to suck the electrodeposition coating liquid L from the overflow tank T2. The electrodeposition coating liquid L is filtered by the filter 33 and adjusted to an appropriate temperature by the heat exchanger 34. It is then discharged from a plurality of the nozzles 35, 36 and 37 into the electrodeposition tank The electrodeposition coating liquid L is discharged from the nozzles 29 and 35 provided on the bottom wall of the electrodeposition tank 1 toward the outlet side, while the electrodeposition coating liquid L is discharged from the nozzles 36 and 37 provided on the both side walls of the electrodeposition tank 1 toward the inlet side. As a result, these discharge forces produce a liquid flow in a direction opposite to a moving direction of the body B in the surface area and the intermediate area through which the body B passes, thereby generating a liquid flow whose direction is equal to the moving direction of the body B in the bottom area under the floor of the body B.

The liquid flow first forms one direction from the outlet side toward the inlet side in the surface area and the intermediate area through which the body B passes and forms one direction from the inlet side toward the outlet side in the bottom area, thus generating one large in-tank circulation flow in the entire electrodeposition tank 1.

Since the in-tank circulation flow has the liquid flow forming one direction in the surface area and the intermediate area through which the body B passes, the appropriate liquid flow causing no retention of the electrodeposition coating liquid in the electrodeposition effective area can be assured. As a result, it is possible to attain prevention of pigment sedimentation or uniformization of pigment dispersion, and removal of air bubbles or heat and prevention of adhesion of extraneous substances. Moreover, since the liquid flow in the surface area and the intermediate area is a counter current of the body B, the relative velocity of the electrodeposition coating liquid L to the body B can be increased, thereby further effectively preventing extraneous substances such as metal powder to adhere. In addition, air bubbles or heat generated on the surface of the body B can be effectively removed, and a difference in the electrodeposition throwing power between the inside and outside plates can be reduced.

Furthermore, since the liquid flow in the entire electrodeposition tank 1 is not caused to form one direction but one large circulation is carried out in the electrodeposition tank 1, a high-performance circulation system or that consisting of multiple pumps or pipes and others is not required even though the treatment tank having a large capacity such as the electrodeposition tank 1 is used, which is advantageous in the facility cost or the running cost.

Moreover, the metal powder and the like contained in the electrodeposition coating liquid L is apt to be retained at the end in the bottom area, i.e., the part of the hopper 11. It is possible to directly collect the metal powder by the hopper 11 to be removed to the outside of the system by using the filter F.

In particular, the electrodeposition coating apparatus according to this embodiment can be substantially realized by only setting the direction of the nozzles and providing the overflow tank T2, which is prominently advantageous in the cost, the work period and others for altering the existing facility.

Figure 4A:
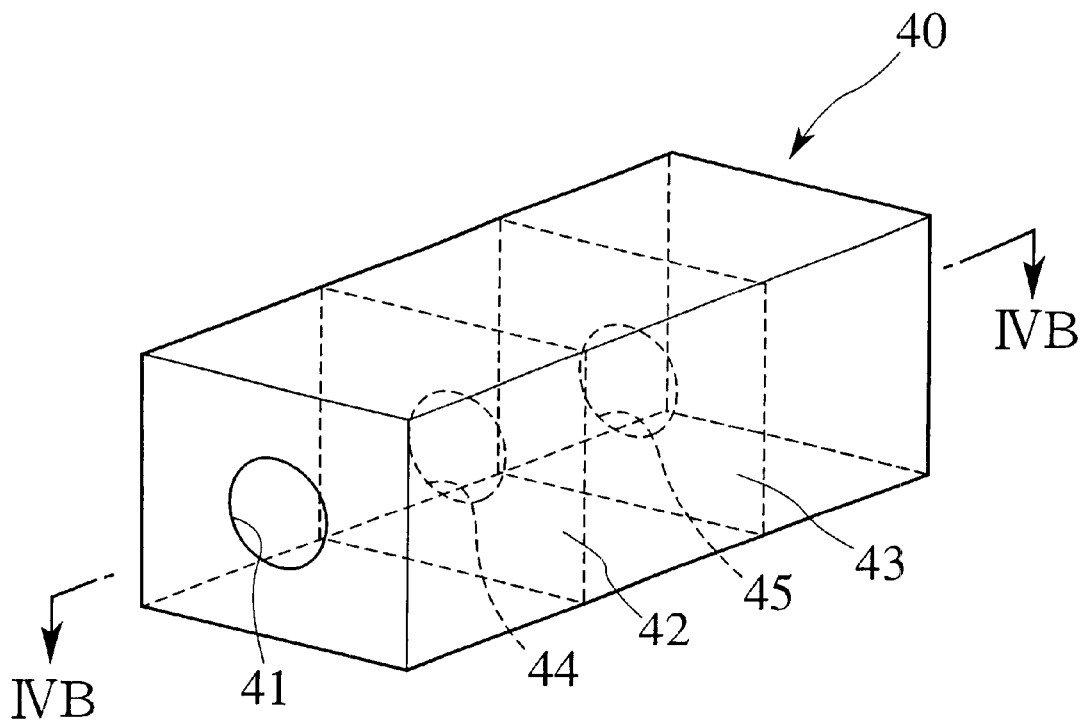
FIGS. 4A and 4B are perspective view and a cross-sectional view showing a test piece for measuring electrodeposition throwing power.
Figure 4B:
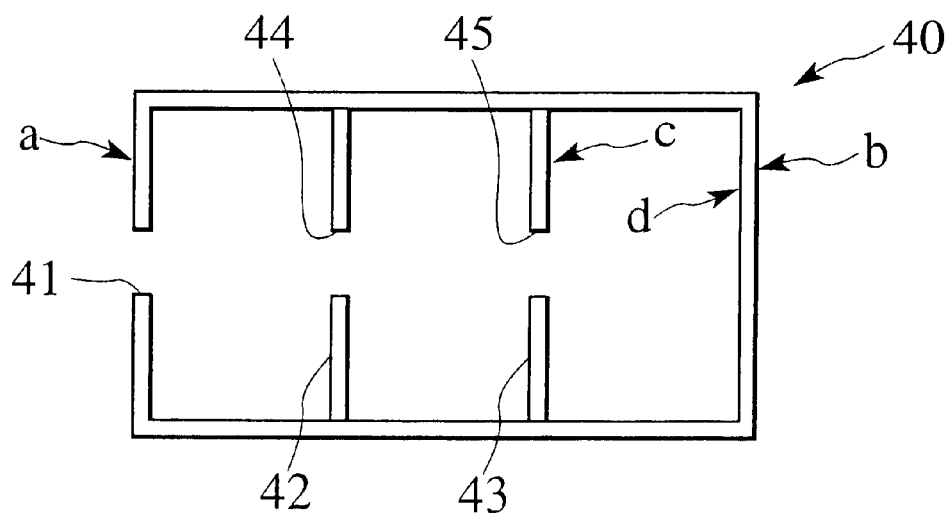

It is to be noted that the relationship between the relative velocity of the coating object B and the electrodeposition coating liquid L and the electrodeposition throwing power was examined. A test piece 40 shown in FIGS. 4A and 4B is an iron box, and an electrodeposition throwing hole of ø8 mm is formed on one surface thereof. Further, two partition plates 42 and 43 are provided inside the box at equal intervals, and electrodeposition throwing holes 44 and 45 of ø8 mm are formed to the respective partition plates 42 and 43.

Figure 5:
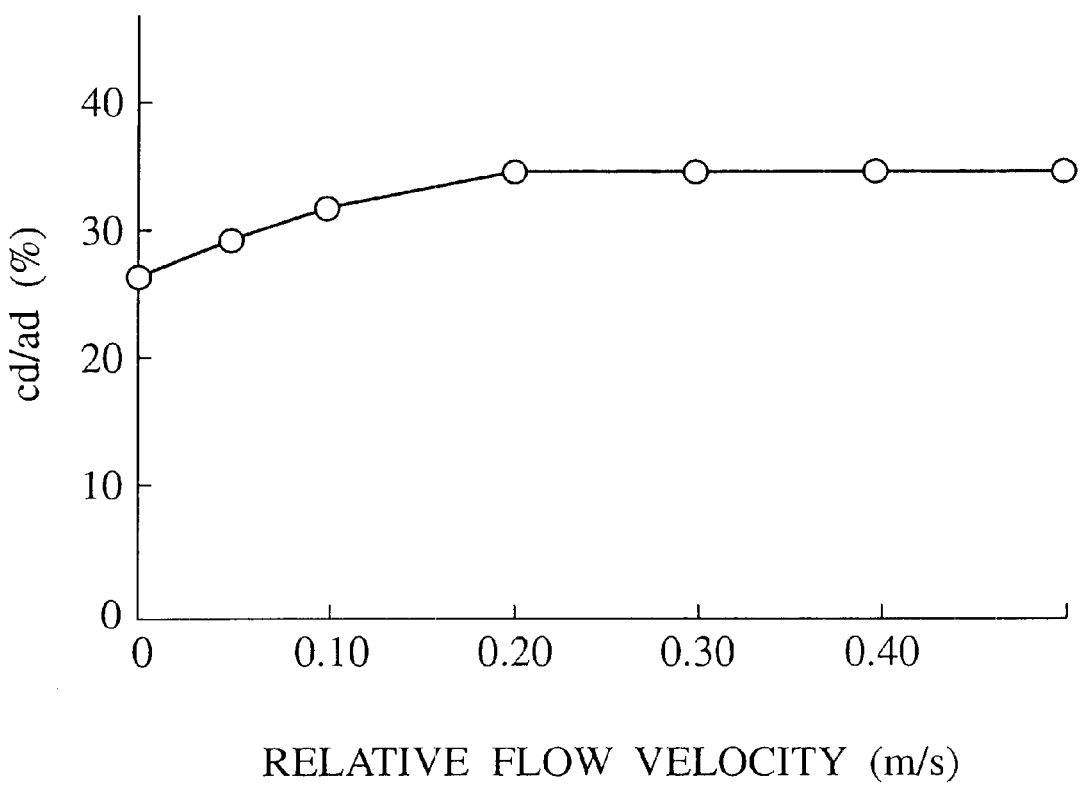
FIG. 5 is a graph showing an experimental result of inside and outside plate throwing power relative to a relative velocity of an electrodeposition coating liquid.

This test piece 40 is completely dipped in the electrodeposition tank in which the electrodeposition coating liquid having a liquid temperature of 28° is filled for three minutes and a voltage of 250 V (slow start was effected for 30 seconds) to perform electrodeposition coating. Electrodeposition coating was applied to multiple test pieces 40 while changing the relative velocity of each test piece 40 and the electrodeposition coating liquid in various ways, and film thicknesses of outside plates a and b and bag-like structures c and d shown in FIG. 4B were respectively measured in order to obtain the film thickness ratio cd/ab (%). FIG. 5 shows its result.

As apparent from a result in this drawing, when the relative flow velocity is not less than 0.2 m/s, the film thickness ratio of the inside plate (in the bag-like structure)/the outside plate approximates 35% and the excessive film thickness of the outside plate and the insufficient film thickness of the inside plate can be prevented, which is ideal for both the cost and the coating quality. Further, even if the relative flow velocity exceeds 0.2 m/s, the film thickness ratio does not become very good.

Moreover, the foreign particle vanishing time (s), the foreign particle discharge ratio (three minutes) and the body relative flow velocity (m/s) of the dip type surface treatment apparatus according to the first embodiment and those of the prior art dip type surface treatment apparatus were compared and examined. FIG. 6 shows its result.

As to the foreign particle vanishing time, an experimental facility having the scale of ⅕ was manufactured to perform simulation of foreign particle vanishing (removal). As a substitution for the foreign particle, 3000 plastic balls having a diameter of 5 mm were used and put into the electrodeposition tank of the experimental facility having the scale of ⅕ in order to measure the time (s) required for removing these balls from the electrodeposition tank.

As a result of experiment, the foreign substances were not removed in the prior art surface treatment apparatus even though more than 10 minutes passed, whereas they were removed in 140 seconds in the surface treatment apparatus according to the first embodiment of the present invention. As a result, it was found that surface bubbles or foreign substances having the light gravity such as plastic balls which floated on the surface of the electrodeposition coating liquid could be removed in a short period of time by using the surface treatment apparatus according to the first embodiment.

As to the foreign substance discharge time, an experimental facility having the scale of ⅕ was used to execute simulation, as in the case of the above-described foreign particle vanishing time. As a substitution for the foreign substances, iron fine particles were used. 30 g of the iron fine particles was put into the electrodeposition tank. After three minutes, a collection ratio was calculated from an amount of iron powder collected by a wire mesh filter provided in a circulation path of the electrodeposition coating liquid.

As a result of experiment, 57.1% of the iron fine particles was discharged in the conventional surface treatment apparatus, whereas 97.2% of the iron fine particles was discharged in the surface treatment apparatus according to the first embodiment of the present invention. Consequently, it was found that foreign metal particles and the like such as iron fine particles which settled down on the bottom of the treatment liquid could be removed by using the surface treatment apparatus according to the first embodiment.

Moreover, as a result of measuring the body relative flow velocity (m/s), the relative flow velocity in the conventional surface treatment apparatus was 0.1 m/s, whereas the relative surface velocity in the surface treatment apparatus according to the first embodiment of the present invention was 0.24 m/s. This results from realization of a counter current caused due to a change in a direction of a riser at the bottom of the electrodeposition tank 1 and realization of another counter current owing to addition of a side riser. It can be, therefore, expected that the body relative velocity can be improved, and the balance of the thickness of the electrodeposition coating film adhering to the inside plate/the outside plate of the body can be enhanced, thereby saving a quantity of coating to be used.

Based on a result of these examinations, the overall judgment was performed. The conventional dip type surface treatment apparatus has a long foreign particle vanishing time, a low foreign particle discharge ratio and a low body relative flow velocity, and it was thus judged as bad (X). On the other hand, the first embodiment has the short foreign particle vanishing time, a high foreign particle discharge ratio and a fast body relative flow velocity, and it was thus judged as excellent (O).

Second Embodiment

A second embodiment will now be described with reference to the accompanying drawings.

Figure 7:
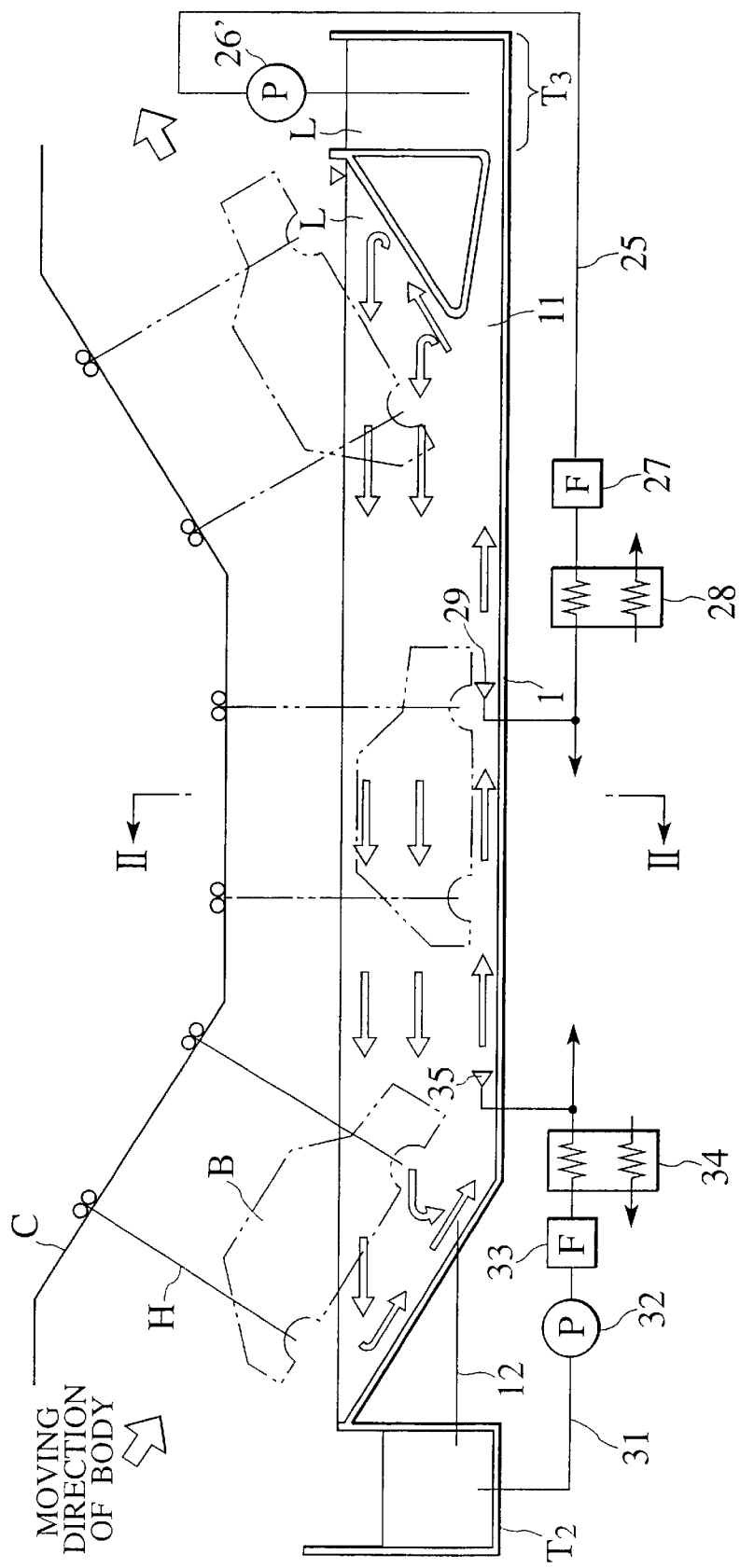
FIG. 7 is a cross-sectional view showing an electrodeposition coating apparatus as a second embodiment of a dip type surface treatment apparatus according to the present invention.

FIG. 7 is a cross-sectional view showing an electrodeposition coating apparatus according to the second embodiment. This second embodiment has a point that a direction of an electrodeposition coating liquid L in an electrodeposition tank 1 is opposite to a moving direction of a body B (the electrodeposition coating liquid L is determined as a counter current) in common with the first embodiment. The second embodiment is different from the first embodiment in that a hopper 11 is provided in a bottom area of the electrodeposition tank 1 on an outlet side of a treatment tank 1, a suction tank T3 communicating with the electrodeposition tank 1 through the hopper 11 is provided and a vertical pump 26' is provided to the suction tank. When the vertical pump is adopted, a serious problem does not occur as compared with a horizontal pump even if the liquid leaks from a pump shaft, and maintenance is easy.

Based on this, a lasher between the suction tank T3 and the electrodeposition tank 1 is heightened so that the electrodeposition tank 1 and the suction tank T3 do not communicate with each other on the upper surface. It is to be noted that the electrodeposition action of the body B, the circulation of the electrodeposition coating liquid L and others in the second embodiment are similar to those in the first embodiment, thereby omitting their explanation.

A characteristic operation in this embodiment is that foreign particles in the electrodeposition tank 1 (mainly foreign particles having a large gravity such as foreign metal particles) are collected in the suction tank T3 communicating with the electrodeposition tank 1 by the hopper 11. The electrodeposition coating liquid L collected in this tank is sucked by the vertical pump 26' and passes through the filter F to flow back to the electrodeposition tank 1, as in the first embodiment.

In particular, according to this embodiment, the electrodeposition coating liquid L containing a large amount of foreign particles such as iron powder collected in the suction tank is sucked by the pump 26', thereby efficiently removing the foreign particles. Therefore, a defect in the coating film such as "irregularity" can be reduced.

Further, the electrodeposition tank 1 and the suction tank T3 communicating with the tank 1 in the bottom area do not have to communicate with each other on the electrodeposition coating liquid surface. Thus, the lasher between these tanks is heightened. Accordingly, the liquid surface of the electrodeposition coating liquid in the electrodeposition tank 1 communicates only with the overflow tank T2 on the inlet side. A quantity of the electrodeposition coating liquid L can be consequently adjusted by only monitoring the liquid surface in the overflow tank T2 on the inlet side, which facilitates management of the quantity of the electrodeposition coating liquid L.

Moreover, when the overflow tanks are provided on both the inlet side and the outlet side, each minimum flow quantity of the treatment liquid on the inlet side and the outlet side is restricted. However, when the overflow tank is provided only on the inlet side, a flow ratio (suction ratio) obtained by suction from the suction tank can be greatly increased, thereby efficiently removing extraneous substances.

With realization of a counter current in the electrodeposition tank 1, surface bubbles or floating foreign particles of the electrodeposition liquid L are streamed to be collected to the inlet side so that they flow into the overflow tank T2. By filtering the electrodeposition coating liquid L which has flowed into the overflow tank T2, foreign particles having a light gravity such as surface bubbles or floating foreign substances can be efficiently collected.

In particular, as in the first embodiment, the electrodeposition coating apparatus according to the second embodiment can be also substantially realized by only setting the direction of the nozzles and providing the overflow tank T2 to the conventional following current type electrodeposition coating apparatus, which is extremely advantageous in the cost and the work period for altering the existing facility adopting the vertical pump.

Further, a foreign particle vanishing time (s), a foreign particle discharge ratio (three minutes) and a body relative flow velocity (m/s) of the dip type surface treatment apparatus according to the second embodiment and those of the prior art dip type surface treatment apparatus were compared and examined. FIG. 8 shows its result. An experimental method is the same as in the first embodiment.

As a result of the experiment, the foreign particles were not removed in the conventional surface treatment apparatus even though more than 10 minutes of the foreign particle vanishing time passed. On the other hand, the foreign particles were removed in 140 seconds in the surface treatment apparatus according to the second embodiment of the present invention.

As to the foreign particle discharge ratio, 57.1% of iron fine particles was discharged by the conventional surface treatment apparatus, whereas 97.2% of the iron fine particles was discharged by the surface treatment apparatus according to the second embodiment of the present invention.

As a result of measuring the body relative flow velocity (m/s), the relative flow velocity of the prior art surface treatment apparatus was 0.1 m/s, whereas the relative flow velocity of the surface treatment apparatus according to the second embodiment of the present invention was 0.24 m/s.

Based on the result of these examinations, the overall judgment was performed. The prior art dip type surface treatment apparatus has a long foreign particle vanishing time, a low foreign particle discharge ratio and a low body relative flow velocity, and it was hence judged as bad (X). On the other hand, the second embodiment has a short foreign particle vanishing time, a high foreign particle discharge ratio and a fast body relative flow velocity, it was hence judged as excellent (O).

As described above, the same experimental result as in the first embodiment was obtained from the second embodiment. Therefore, it was found in the second embodiment that the similar advantage could be obtained by the same operation as in the first embodiment.

Third Embodiment

FIG. 9 is a cross-sectional view showing an electrodeposition coating apparatus according to a third embodiment. The third embodiment has a point that an electrodeposition coating liquid L in an electrodeposition tank 1 flows in a direction opposite to a moving direction of a body B (the electrodeposition coating liquid L is determined as a counter current) in common with the first and second embodiments. The third embodiment is different from the first and second embodiments in that a bottom wall of the electrodeposition tank 1 is inclined downwards in the vertical direction from the inlet side toward the outlet side of the tank so that a hopper 11 is positioned at the lowermost surface (it is indicated by an angle of inclination α in the drawing). Further, in order to temporarily transfer the electrodeposition coating liquid L for cleaning and maintaining the electrodeposition tank 1 itself or various devices such as a riser, a liquid transfer tank 5 is provided, and a branch coating pipe 25a is provided between a pump 26 of a coating pipe 25 and a filter 27. An opening/closing valve 25b is disposed to the branch coating pipe 25a and the electrodeposition coating liquid L in the electrodeposition tank 1 can be thereby transferred to the liquid transfer tank 5 by opening the opening/closing valve 25b.

By inclining the bottom wall of the electrodeposition tank 1 toward the hopper 11 in this manner, a full amount of the electrodeposition coating liquid L accommodated in the electrodeposition tank 1 can be transferred to the liquid transfer tank 5, thereby wasting no remaining coating material.

Additionally, in this example, the circulation system to the liquid transfer tank 5 shares the coating pipe 25, and the electrodeposition coating liquid L is constantly circulated in the coating pipe 25 during the steady operation It is, therefore, possible to prevent the coating material from settling down in the pipe which may led to irregularity of foreign particles.

It is to be noted that the entire bottom wall of the electrodeposition tank 1 does not have to be inclined from the inlet side to the outlet side of the tank as shown in the drawing and the bottom wall may be partially inclined.

Any Other Embodiment

FIG. 10 is a graph showing an example of driving the pump according to the present invention. This pump corresponds to the pump 26 and/or the pump 32 in the example shown in FIG. 1. In the surface treatment apparatus of the coating line, it is desirable that the energy-saving operation is carried out as much as possible when a workpiece such as a body is not put into the treatment tank, but prevention of sedimentation must be also taken into consideration in an apparatus dealing with the treatment liquid such as the electrodeposition coating liquid L which is apt to settle down.

Thus, in this example, the pump is driven as follows when the surface treatment apparatus is not operated, i.e., a workpiece is not brought in.

That is, power W2 which is approximately 40% to 70% of power basically fed during the operation is supplied to the pump for the energy-saving operation, as shown in FIG. 10. However, taking prevention of sedimentation into account, a time period t1 for supplying the power W1 equal to that fed during the operation is provided for each cycle time t2, i.e., at time intervals of t2. The time period ti is, for example, 30 seconds to 60 seconds, and the cycle time t2 is, for example, 30 minutes to 60 minutes.

As a result, the treatment liquid in the treatment tank, whose circulation amount is equal to that during the operation, is circulated during the time period t1 for each cycle time t2 in the non-operation period. In any other time, the treatment liquid, whose circulation amount is reduced to approximately 40% to 70%, is circuited. Consequently, the treatment liquid is efficiently prevented from settling down, and 30% to 60% energy saving can be attained.

It is to be noted that the above-described embodiments have been described for easily understanding the present invention but not for restricting the invention. Accordingly, each constituent part disclosed in the above embodiments includes all the changes in design or equivalents which belong to a technical scope of the present invention.

For example, a communicating tube 12 such as shown in FIG. 1 can be provided between the overflow tank T2 and the electrodeposition tank 1 in order to prevent the liquid surface of the overflow tank T2 provided on the inlet side from lowering.

The dipping method for a treatment object and a coating object in the dip type surface treatment apparatus, the dip type surface treatment method and the electrodeposition coating apparatus according to the present invention includes a full-dip method for completely dipping a treatment object or a coating object and a half-dip method for partially dipping a treatment object and a coating object.

Moreover, the surface treatment in the dip type surface treatment apparatus and the dip type surface treatment method includes pretreatments such as a degreasing treatment, a surface adjustment treatment or a chemical treatment and electrodeposition coating.

The dip type surface treatment apparatus, the dip type surface treatment method and the electrodeposition coating apparatus according to the present invention can be applied to surface treatments for various metal components such as a vehicle body or automotive parts.

More generally describing, it should be understood that many modifications and adaptations of the invention will become apparent to those skilled in the art and it is intended to encompass such obvious modifications and changes in the scope of the claims appended hereto.

The entire contents of Japanese Patent Application No. 2000-71609, filed on Mar. 15, 2000, Japanese Patent Application No. 2000-342321, filed on Nov. 9, 2000, and Japanese Patent Application No. 2001-36692, filed on Feb. 14, 2001, are hereby incorporated by reference.

What is claimed is:

1. A surface treatment apparatus for dipping a treatment object in a treatment liquid filled in a treatment tank, which is divided in a vertical direction into three areas of a surface area, an intermediate area and a bottom area that have substantially the same height, said apparatus comprising:

a first circulation system for causing a flow direction of said treatment liquid in said surface area and said intermediate area through which said treatment object passes in said treatment tank to be opposite to a moving direction of said treatment object; and a second circulation system for causing a flow direction of said treatment liquid in said bottom area in said treatment tank to be equal to the moving direction of said treatment object.

2. The surface treatment apparatus according to claim 1, wherein an overflow tank is provided to each of an inlet side and an outlet side of said treatment tank.

3. The surface treatment apparatus according to claim 2, wherein a hopper for partially collecting said treatment liquid which has flowed down is formed at an end of said treatment tank, the end being a downstream end of said treatment liquid in said bottom area.

4. The surface treatment apparatus according to claim 3, wherein said second circulation system sucks said treatment liquid from said hopper and one of said overflow tanks, and said first circulation system sucks said treatment liquid from the other of said overflow tanks.

5. The surface treatment apparatus according to claim 1, wherein a hopper for partially collecting said treatment liquid which has flowed down is formed at an end of said treatment tank, the end being a downstream end of said treatment liquid in said bottom area.

6. The surface treatment apparatus according to claim 5, wherein a bottom wall of said treatment tank is inclined so that said hopper may be a lowermost surface.

7. The surface treatment apparatus according to claim 1, wherein said first circulation system includes a riser nozzle which is provided on a side wall of said treatment tank and which forms a flow of said treatment liquid in said intermediate area.

8. The surface treatment apparatus according to claim 1, wherein power fed during the operation of the apparatus and power which is 40% to 70% of said power fed during the operation are alternately and repeatedly supplied to at least one of pumps provided to said first circulation system and said second circulation system during the non-operation of the apparatus.

9. The surface treatment apparatus according to claim 1, wherein at least one of said pumps provided to said first circulation system and said second circulation system is a vertical pump.

10. The surface treatment apparatus according to claim 9, wherein a suction tank which communicates with said treatment tank in said bottom area is provided on said outlet side of said treatment tank.

11. The surface treatment apparatus according to claim 10, wherein a hopper which partially collects said treatment liquid which has flowed down is formed on said outlet side of said treatment tank.

12. The surface treatment apparatus according to claim 11, wherein an overflow tank is provided on said inlet side of said treatment tank.

13. The surface treatment apparatus according to claim 11, wherein said second circulation system sucks said treatment liquid from said hopper and said suction tank, and said first circulation system sucks said treatment liquid from said overflow tank.

14. The surface treatment apparatus according to claim 11, wherein said bottom wall of said treatment tank is inclined so that said hopper may be a lowermost surface.

15. The surface treatment apparatus according to claim 9, wherein said first circulation system includes a riser nozzle which is provided on a side wall of said treatment tank and which forms a flow of said treatment liquid in said intermediate area.

16. A surface treatment method for dipping a treatment object in a treatment liquid filled in a treatment tank, which is divided in a vertical direction into three areas of a surface area, an intermediate area and a bottom area that have substantially the same height, said method comprising:

causing a flow direction of said treatment liquid in said surface area and said intermediate area through which said treatment object passes in said treatment tank to be opposite to a moving direction of said treatment object; and causing a flow direction of said treatment liquid in said bottom area in said treatment tank to be equal to the moving direction of said treatment object, thereby treating said treatment object.

17. An electrodeposition coating apparatus for applying a voltage between a coating object dipped in a coating liquid in an electrodeposition tank and an electrode to form a coating film, said electrodeposition tank being divided in a vertical direction into three areas of a surface area, an intermediate area and a bottom area that have substantially the same height, said apparatus comprising:

a first circulation system for causing a flow direction of a coating liquid in said surface area and said intermediate area through which said coating object passes in said electrodeposition tank to be opposite to a moving direction of said coating object; and a second circulation system for causing a flow direction of said coating liquid in said bottom area in said electrodeposition tank to be equal to the moving direction of said coating object.

* * * * *